US 12,503,777 B2
United States Patent
Mohri et al.

(10) Patent No.: US 12,503,777 B2
(45) Date of Patent: Dec. 23, 2025

(54) ELECTROLYSIS SYSTEM

(71) Applicant: HONDA MOTOR CO., LTD., Tokyo (JP)

(72) Inventors: Masahiro Mohri, Wako (JP); Kazuki Yanagisawa, Wako (JP); Misato Maki, Wako (JP); Hideaki Yoneda, Wako (JP); Jumpei Yoshida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 485 days.

(21) Appl. No.: 18/100,022

(22) Filed: Jan. 23, 2023

(65) Prior Publication Data
US 2023/0243045 A1 Aug. 3, 2023

(30) Foreign Application Priority Data

Jan. 31, 2022 (JP) .................................. 2022-012862
Oct. 19, 2022 (JP) .................................. 2022-167555

(51) Int. Cl.
*C25B 3/03* (2021.01)
*C25B 1/042* (2021.01)
(Continued)

(52) U.S. Cl.
CPC ................ *C25B 3/03* (2021.01); *C25B 1/042* (2021.01); *C25B 1/23* (2021.01); *C25B 3/26* (2021.01);
(Continued)

(58) Field of Classification Search
None
See application file for complete search history.

(56) References Cited

U.S. PATENT DOCUMENTS 5,128,003 A * 7/1992 Murdoch .................. C25B 1/04
423/418
6,747,066 B2 * 6/2004 Wang ........................ C01B 3/56
518/703
(Continued)

FOREIGN PATENT DOCUMENTS

CN 205258619 U 5/2016
CN 106460208 A 2/2017
(Continued)

OTHER PUBLICATIONS

Office Action dated Apr. 23, 2024 issued in the corresponding Japanese Patent Application No. 2022-167555 with the English machine translation thereof.
(Continued)

*Primary Examiner* — Harry D Wilkins, III
(74) *Attorney, Agent, or Firm* — Carrier, Shende & Associates P.C.; Joseph P. Carrier; Fulchand P. Shende

(57) ABSTRACT

An electrolysis system includes: an oxygen consumption device that consumes, using hydrogen, oxygen gas in exhaust gas; a valve device that is configured to switch a supply destination of the hydrogen-containing gas output from a solid oxide electrolysis stack to either one of the oxygen consumption device or a generating device; and a control device that controls the valve device according to the oxygen concentration in the exhaust gas output from the oxygen consumption device to switch the supply destination of the hydrogen-containing gas.

10 Claims, 8 Drawing Sheets

(51) Int. Cl.
*C25B 1/23* (2021.01)
*C25B 3/26* (2021.01)
*C25B 11/042* (2021.01)
*C25B 15/02* (2021.01)
*C25B 15/027* (2021.01)
*C25B 15/08* (2006.01)

(52) U.S. Cl.
CPC ............ *C25B 11/042* (2021.01); *C25B 15/02* (2013.01); *C25B 15/027* (2021.01); *C25B 15/081* (2021.01)

(56) References Cited

U.S. PATENT DOCUMENTS

| | | | |
|---|---|---|---|
| 9,631,284 B2* | 4/2017 | Braun | C25B 1/00 |
| 2013/0109767 A1* | 5/2013 | Bogild Hansen | C07C 1/0485 |
| | | | 422/186.23 |
| 2015/0060296 A1* | 3/2015 | Elangovan | C25B 3/25 |
| | | | 205/555 |
| 2016/0369688 A1 | 12/2016 | Hamad et al. | |
| 2018/0086985 A1* | 3/2018 | von Olshausen | C10G 2/50 |
| 2018/0261865 A1 | 9/2018 | Jahnke | |
| 2021/0054510 A1 | 2/2021 | Schjodt et al. | |
| 2023/0111972 A1* | 4/2023 | Echigo | B01J 23/6482 |
| | | | 518/721 |
| 2023/0114967 A1* | 4/2023 | Echigo | C07C 1/0435 |
| | | | 518/704 |
| 2023/0304164 A1* | 9/2023 | Yoneda | C25B 1/042 |
| 2023/0352698 A1 | 11/2023 | Matsuyoshi et al. | |

FOREIGN PATENT DOCUMENTS

| | | |
|---|---|---|
| CN | 107699915 A | 2/2018 |
| CN | 107922863 A | 4/2018 |
| CN | 111971418 A | 11/2020 |
| JP | 2012-236123 A | 12/2012 |
| JP | 2018-523046 A | 8/2018 |
| JP | 2019-502227 A | 1/2019 |
| JP | 2019-108238 A | 7/2019 |
| JP | 2021-161124 A | 10/2021 |
| JP | 2023-093823 A | 7/2023 |
| TW | 202200490 A | 1/2022 |
| WO | 2015/180752 A1 | 12/2015 |
| WO | 2021/201194 A1 | 10/2021 |

OTHER PUBLICATIONS

Office Action and Search Report dated Oct. 1, 2025 issued in the corresponding Chinese Patent Application 202310045343.9 with the English machine translation thereof.

* cited by examiner

ELECTROLYSIS SYSTEM

CROSS-REFERENCE TO RELATED APPLICATIONS

This application is based upon and claims the benefit of priority from Japanese Patent Applications No. 2022-012862 filed on Jan. 31, 2022 and No. 2022-167555 filed on Oct. 19, 2022, the contents of which are incorporated herein by reference.

BACKGROUND OF THE INVENTION

Field of the Invention

The present invention relates to an electrolysis system including a solid oxide electrolysis stack.

Description of the Related Art

JP 2012-236123 A discloses a system having a methanation reactor and a stack having a solid oxide fuel cell. The methanation reactor converts hydrogen and carbon dioxide contained in exhaust gas discharged from a fuel electrode of a solid oxide fuel cell into methane through the reaction of hydrogen and carbon dioxide. The exhaust gas from the methanation reactor is supplied to the fuel electrode of the solid oxide fuel cell.

SUMMARY OF THE INVENTION

Incidentally, as a source of carbon dioxide discharged into the solid oxide fuel cell, there is a case where exhaust gas (biogas) discharged from an apparatus having a biomass, exhaust gas discharged from a power plant or an iron works, and the like is adopted. However, there is a case where oxygen gas is contained in the exhaust gas. In this case, the oxygen gas contained in the exhaust gas may reach a catalyst used in the methanation reactor via the solid oxide fuel cell. When oxygen reaches the catalyst of the methanation reactor, there is a concern that the catalyst deteriorates because of oxidation.

An object of the present invention is to solve the aforementioned problem.

An aspect of the present invention is an electrolysis system including a solid oxide electrolysis stack that electrolyzes carbon dioxide gas and water vapor and a generating device that generates a hydrocarbon from hydrogen-containing gas containing hydrogen gas generated by the solid oxide electrolysis stack through electrolysis; an oxygen consumption device that consumes, using hydrogen, oxygen gas in exhaust gas containing the carbon dioxide gas; an exhaust gas path that is configured to supply, from the oxygen consumption device to the solid oxide electrolysis stack, the exhaust gas in which purity of the carbon dioxide gas has risen because of consumption of the oxygen gas; a hydrogen-containing gas path that is configured to supply the hydrogen-containing gas from the solid oxide electrolysis stack to the generating device; a hydrogen-containing gas branch path that branches from the hydrogen-containing gas path and is connected to the oxygen consumption device; an oxygen concentration sensor that detects an oxygen concentration in the exhaust gas output from the oxygen consumption device; a valve device that is configured to switch a supply destination of the hydrogen-containing gas output from the solid oxide electrolysis stack to either one of the oxygen consumption device or the generating device; and a control device that controls the valve device according to the oxygen concentration to switch the supply destination of the hydrogen-containing gas.

Another aspect of the present invention is an electrolysis system including a solid oxide electrolysis stack that electrolyzes carbon dioxide gas and water vapor; a generating device that generates a hydrocarbon from a hydrogen-containing gas containing hydrogen gas generated by the solid oxide electrolysis stack through electrolysis; an oxygen consumption device that consumes, using hydrogen, oxygen gas in exhaust gas containing the carbon dioxide gas; an exhaust gas path that is configured to supply the exhaust gas from the oxygen consumption device to the solid oxide electrolysis stack; an exhaust gas branch path that branches from the exhaust gas path and is connected to the oxygen consumption device; an oxygen concentration sensor that detects the oxygen concentration in the exhaust gas output from the oxygen consumption device; a valve device that is configured to switch a supply destination of the exhaust gas output from the oxygen consumption device to the oxygen consumption device or the solid oxide electrolysis stack; a tank that is configured to store the hydrogen supplied to the oxygen consumption device; and a control device that controls the valve device according to the oxygen concentration to switch the supply destination of the exhaust gas to the oxygen consumption device and to open an on-off valve that opens and closes an outlet of the tank.

According to the above aspect, it is possible to prevent oxygen from reaching the generating device. As a result, deterioration of the catalyst used in the generating device can be alleviated.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

Figure 1:
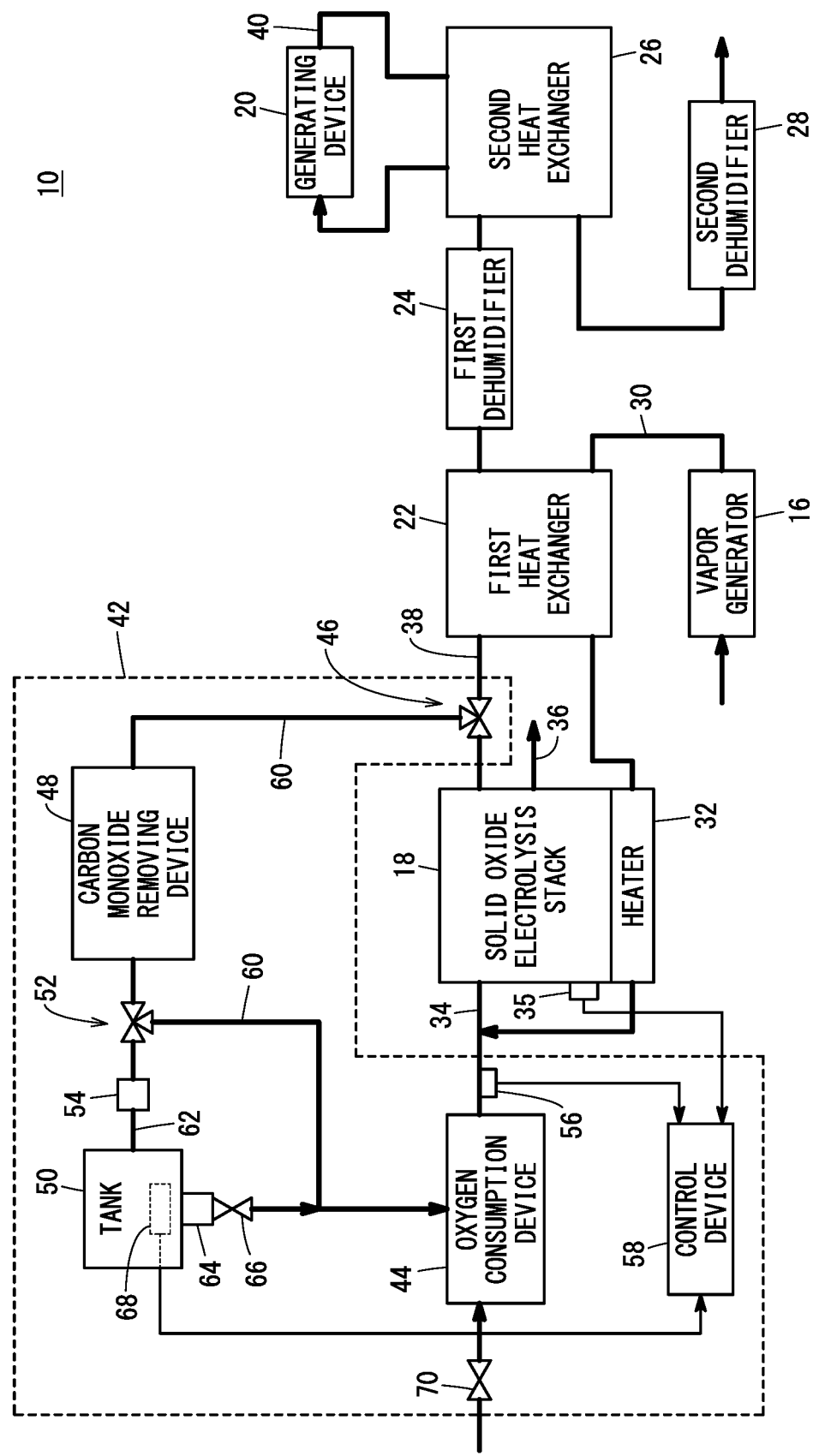
FIG. 1 is a schematic diagram showing the configuration of an electrolysis system according to the first embodiment.

FIG. 1 is a schematic diagram showing a configuration of an electrolysis system 10 according to a first embodiment. The electrolysis system 10 includes a vapor generator 16, a solid oxide electrolysis stack 18, a generating device 20, a first heat exchanger 22, a first dehumidifier 24, a second heat exchanger 26, and a second dehumidifier 28.

The vapor generator 16 heats water supplied from a water generation source to generate water vapor. The water generation source may be a water supply device or a tank. Further, the water generation source may be a plant facility that discharges exhaust gas containing water. When the water generation source is a plant facility, the vapor generator 16 may extract water vapor from exhaust gas discharged from the plant facility of a power plant, a steel plant, etc. In this case, energy saving can be achieved in comparison with a case where water vapor is generated from a water supply device and the like. The vapor generator 16 outputs water vapor generated by heating water and the like to a vapor path 30.

The vapor path 30 is a flow path for supplying vapor from the vapor generator 16 to an exhaust gas path 34. The vapor path 30 passes through the first heat exchanger 22 and a heater 32 in this order. The water vapor output to the vapor path 30 is heated by the first heat exchanger 22 and the heater 32, and flows into the exhaust gas path 34.

The heater 32 is disposed near the solid oxide electrolysis stack 18 to heat the solid oxide electrolysis stack 18. The exhaust gas path 34 is a flow path for supplying exhaust gas containing carbon dioxide gas from a carbon dioxide emission source to the solid oxide electrolysis stack 18. The carbon dioxide gas output to the exhaust gas path 34 flows into the solid oxide electrolysis stack 18 together with water vapor supplied from the vapor path 30.

The carbon dioxide emission source may be an extraction device for extracting carbon dioxide gas from the atmosphere, a tank for storing carbon dioxide gas, or a plant facility capable of recovering and discharging carbon dioxide gas. When the carbon dioxide emission source is a plant facility, it may be the same as the plant facility of the water generation source.

The solid oxide electrolysis stack 18 electrolyzes carbon dioxide gas. In the present embodiment, the solid oxide electrolysis stack 18 performs co-electrolysis of carbon dioxide gas and water vapor. The solid oxide electrolysis stack 18 includes a plurality of unit cells. Each unit cell is provided with a membrane electrode assembly (MEA) in which an electrolytic membrane is sandwiched between an anode electrode and a cathode electrode.

The solid oxide electrolysis stack 18 is heated to a temperature higher than a predetermined temperature that is set in advance as a temperature at which electrolysis becomes possible. In the present embodiment, the temperature of the solid oxide electrolysis stack 18 is raised by the heater 32. The temperature of the solid oxide electrolysis stack 18 is detected by a temperature sensor 35. The temperature sensor 35 is installed at a position of the solid oxide electrolysis stack 18 that reflects a representative temperature of the solid oxide electrolysis stack 18. For example, the temperature sensor 35 is installed at an outlet of the solid oxide electrolysis stack 18.

Between the anode electrode and the cathode electrode of each unit cell, the solid oxide electrolysis stack 18 supplies power supplied from the outside, and the solid oxide electrolysis stack 18 supplies carbon dioxide gas and water vapor to the cathode electrode of each unit cell. Each unit cell starts the electrolysis of carbon dioxide gas and water vapor as the temperature of the solid oxide electrolysis stack 18 rises. When the electrolysis of carbon dioxide gas and water vapor starts, carbon monoxide and hydrogen are produced at the cathode electrode, and oxygen is produced at the anode electrode.

The solid oxide electrolysis stack 18 collects the oxygen gas generated in each unit cell and outputs the oxygen gas to an oxygen gas path 36. The oxygen gas path 36 is a flow path for supplying oxygen from the solid oxide electrolysis stack 18 to an oxygen demand device. The oxygen demand device may be a tank. As described above, when the carbon dioxide emission source is a plant facility, the plant facility can be the oxygen demand device. The oxygen output to the oxygen gas path 36 flows into the oxygen demand device.

The solid oxide electrolysis stack 18 collects the hydrogen-containing gas including the hydrogen gas generated in each unit cell and outputs the hydrogen-containing gas to a hydrogen-containing gas path 38. The hydrogen-containing gas includes carbon monoxide gas that has been produced in each unit cell and water vapor that has not been electrolyzed.

The hydrogen-containing gas path 38 is a flow path for supplying a hydrogen-containing gas from the solid oxide electrolysis stack 18 to the generating device 20. The hydrogen-containing gas path 38 passes through the first heat exchanger 22, the first dehumidifier 24, and the second heat exchanger 26 in this order. The hydrogen-containing gas output to the hydrogen-containing gas path 38 is cooled by the first heat exchanger 22. Water vapor contained in the cooled hydrogen-containing gas is removed by the first dehumidifier 24. The hydrogen-containing gas from which water vapor has been removed is warmed by the second heat exchanger 26 and flows into the generating device 20.

The generating device 20 generates, through a catalytic reaction, hydrocarbons from carbon monoxide and hydrogen contained in the hydrogen-containing gas. The generating device 20 may produce hydrocarbons using a Fischer-Tropsch process. The generating device 20 outputs the hydrocarbons produced through the catalytic reaction to a hydrocarbon path 40.

The hydrocarbon path 40 is a flow path for supplying the hydrocarbons from the generating device 20 to a hydrocarbon request device. The hydrocarbon request device may be a tank. The hydrocarbon path 40 passes through the second heat exchanger 26 and the second dehumidifier 28 in this order. The hydrocarbons output to the hydrocarbon path 40 is cooled by the second heat exchanger 26. Moisture generated due to this cooling is removed by the second dehumidifier 28. The dehumidified hydrocarbons flows into the hydrocarbon request device.

The electrolysis system 10 of the present embodiment further includes an oxygen gas consumption mechanism 42. The oxygen gas consumption mechanism 42 is a mechanism for consuming oxygen gas contained in exhaust gas discharged from the carbon dioxide emission source. The oxygen gas consumption mechanism 42 includes an oxygen consumption device 44, a valve device 46, a carbon monoxide removing device 48, a tank 50, a second valve device 52, a booster pump 54, an oxygen concentration sensor 56, and a control device 58.

The oxygen consumption device 44 is provided on the exhaust gas path 34. The oxygen consumption device 44 uses hydrogen to consume oxygen gas contained in the exhaust gas. The exhaust gas in which purity of carbon dioxide has gone up by the consumption of the oxygen gas is supplied from the oxygen consumption device 44 to the solid oxide electrolysis stack 18 via the exhaust gas path 34. The exhaust gas with heightened purity of carbon dioxide includes carbon dioxide and water vapor generated by combustion of oxygen gas and hydrogen.

The oxygen consumption device 44 may be equipped with a catalyst for reacting oxygen gas with hydrogen to produce water. In this case, the oxygen consumption device 44 heats the catalyst and oxidizes and decomposes impurities in the exhaust gas with the heated catalyst. In this oxidative decomposition process, oxygen gas reacts with hydrogen and is converted to water and consumed. As the oxygen consumption device 44 equipped with a catalyst, a catalytic combustion heater and the like can be used. Examples of the catalyst include palladium catalyst and the like. The water produced at the oxygen consumption device 44 may be supplied to the vapor generator 16. In this case, water used by the vapor generator 16 can be conserved.

A hydrogen-containing gas branch path 60 is connected to the oxygen consumption device 44. The hydrogen-containing gas branch path 60 branches from the hydrogen-containing gas path 38 between the solid oxide electrolysis stack 18 and the first heat exchanger 22 and is connected to the oxygen consumption device 44.

The valve device 46 is configured in a manner that a destination (supply destination) to which the hydrogen-containing gas output from the solid oxide electrolysis stack 18 is supplied can be switched to either one of the oxygen consumption device 44 or the generating device 20. The valve device 46 may be made up from a three way valve or two on-off valves.

When the valve device 46 is made up from a three way valve, the three way valve is provided at a portion (first contact point) where the hydrogen-containing gas path 38 and the hydrogen-containing gas branch path 60 are in contact with each other. When the valve device 46 is made up from two on-off valves, one of the two on-off valves is provided on the hydrogen-containing gas path 38 between the first contact point and the first heat exchanger 22. The other of the two on-off valves is provided on the hydrogen-containing gas branch path 60 near the first contact point. In the present embodiment, the valve device 46 is made up from a three way valve (see FIG. 1).

The carbon monoxide removing device 48 is provided on the hydrogen-containing gas branch path 60. The carbon monoxide removing device 48 removes carbon monoxide by oxidizing carbon monoxide to produce carbon dioxide. The carbon monoxide removing device 48 may oxidize carbon monoxide with a catalyst.

The carbon monoxide removing device 48 is not an essential component. If the oxygen consumption device 44 is not equipped with a catalyst or if the catalyst of the oxygen consumption device 44 has properties (resistance) that the catalyst is not easily deteriorated by carbon monoxide, the carbon monoxide removing device 48 can be omitted. Examples of the catalyst that is not easily deteriorated by carbon monoxide include a palladium catalyst and the like.

The tank 50 is a container capable of storing hydrogen that is supplied to the oxygen consumption device 44. The hydrogen stored in the tank 50 is hydrogen gas filled by a filling device or hydrogen-containing gas supplied from the hydrogen-containing gas branch path 60. The tank 50 is provided on a bypass path 62.

The bypass path 62 branches from the hydrogen-containing gas branch path 60 between the carbon monoxide removing device 48 and the oxygen consumption device 44, passes through the tank 50, and joins the hydrogen-containing gas branch path 60. A portion where the bypass path 62 joins the hydrogen-containing gas branch path 60 is located downstream of a portion where the bypass path 62 branches from the hydrogen-containing gas branch path 60. In the case where the carbon monoxide removing device 48 is omitted, the bypass path 62 branches from an arbitrary position of the hydrogen-containing gas branch path 60.

An on-off valve 66 is provided at an outlet 64 of the tank 50, and a pressure sensor 68 is provided inside the tank 50. The pressure sensor 68 detects the pressure inside the tank 50.

The second valve device 52 is configured in a manner that the supply destination of the hydrogen-containing gas supplied from the hydrogen-containing gas path 38 can be switched to either one of the oxygen consumption device 44 or the tank 50. The second valve device 52 may be made up from a three way valve or two on-off valves.

When the second valve device 52 is made up from a three way valve, the three way valve is provided at a portion (second contact point) where the hydrogen-containing gas branch path 60 and the bypass path 62 are in contact with each other. When the second valve device 52 is made up from two on-off valves, one of the two on-off valves is provided on the hydrogen-containing gas branch path 60 between the second contact point and the oxygen consumption device 44. The other of the two on-off valves is provided on the bypass path 62 near the second contact point. In the present embodiment, the second valve device 52 is made up from a three way valve (see FIG. 1).

The booster pump 54 boosts the pressure of the hydrogen-containing gas supplied from the hydrogen-containing gas branch path 60 and supplies the pressure-boosted hydrogen-containing gas to the tank 50. The booster pump 54 is not an essential component. That is, the booster pump 54 may be omitted. In this case, the hydrogen-containing gas supplied from the hydrogen-containing gas branch path 60 flows into the tank 50 without being boosted.

The oxygen concentration sensor 56 is a sensor for detecting the oxygen concentration in the exhaust gas output from the oxygen consumption device 44. The oxygen concentration sensor 56 is provided on the exhaust gas path 34 near the outlet of the oxygen consumption device 44.

The control device 58 controls the valve device 46, the second valve device 52, and the on-off valve 66 based on the temperature detected by the temperature sensor 35, the oxygen concentration detected by the oxygen concentration sensor 56, and the pressure detected by the pressure sensor 68.

Figure 2:
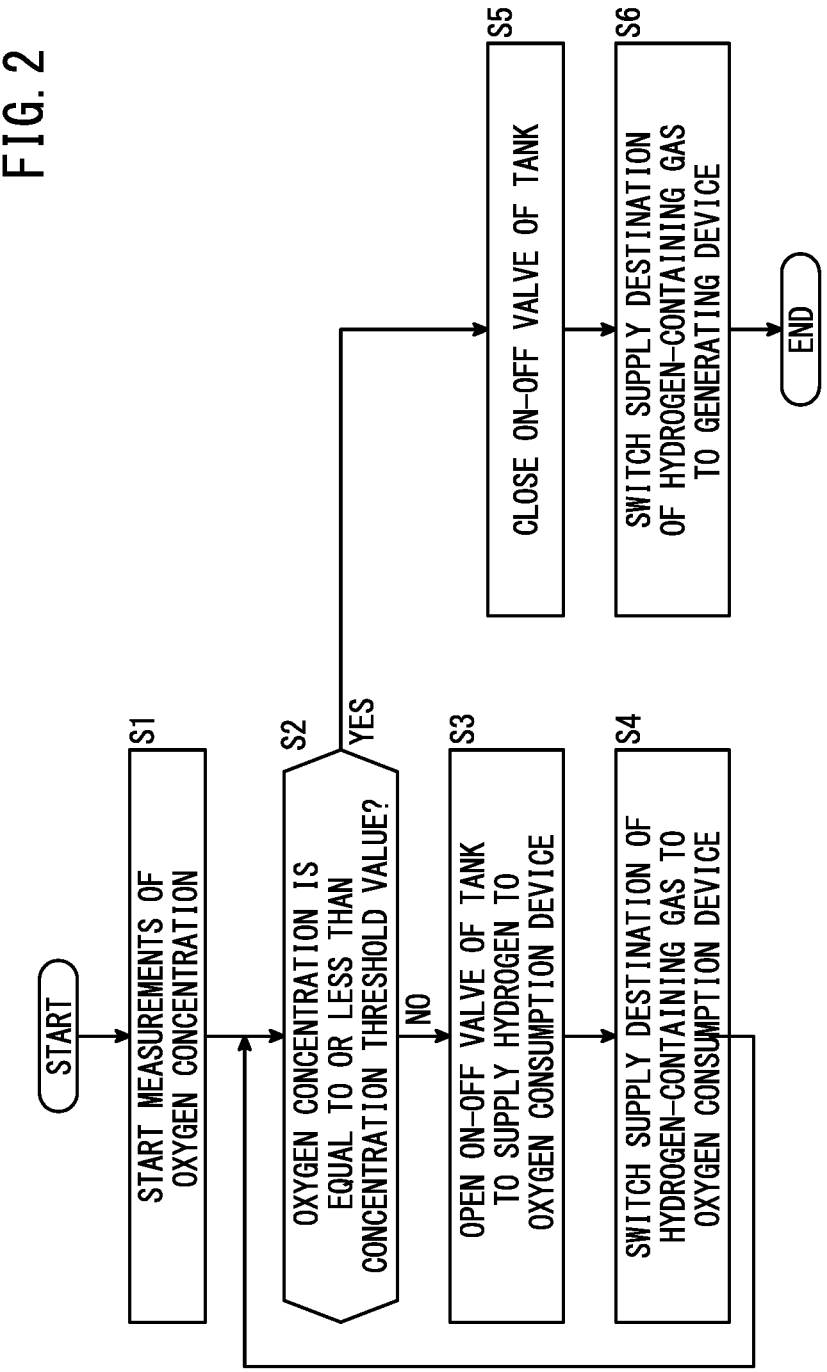
FIG. 2 is a flowchart showing the procedure of a first control process.

When the solid oxide electrolysis stack 18 is activated, the control device 58 executes the first control process. FIG. 2 is a flowchart showing the procedure of the first control process. The first control process is started when a command to activate the solid oxide electrolysis stack 18 is received.

In step S1, the control device 58 causes the oxygen concentration sensor 56 to start measurements. When the measurements of the oxygen concentration sensor 56 is started, the first control process proceeds to step S2.

In step S2, the control device 58 compares the oxygen concentration detected by the oxygen concentration sensor 56 with a predetermined concentration threshold value. When the oxygen concentration exceeds the concentration threshold value (step S2: NO), the first control process proceeds to step S3.

In step S3, the control device 58 opens the on-off valve 66 of the tank 50 to supply hydrogen (hydrogen gas or hydrogen-containing gas) stored in the tank 50 to the oxygen consumption device 44 via the hydrogen-containing gas branch path 60. When the on-off valve 66 of the tank 50 is opened, the first control process proceeds to step S4.

In step S4, the control device 58 controls the valve device 46 to switch to the oxygen consumption device 44 the supply destination of the hydrogen-containing gas output from the solid oxide electrolysis stack 18. Further, the control device 58 controls the second valve device 52 to switch to the oxygen consumption device 44 the destination of the hydrogen-containing gas supplied to the hydrogen-containing gas branch path 60. Thus, the hydrogen-containing gas output from the solid oxide electrolysis stack 18 is supplied to the oxygen consumption device 44 via the hydrogen-containing gas branch path 60. Therefore, the oxygen gas is prevented from reaching the generating device 20. When the supply destination of the hydrogen-containing gas is switched to the oxygen consumption device 44, the first control process returns to step S2.

In step S2, when the oxygen concentration is equal to or less than the concentration threshold value (step S2: YES), the first control process proceeds to step S5.

In step S5, the control device 58 closes the on-off valve 66 of the tank 50 and stops the supply of hydrogen (hydrogen gas or hydrogen-containing gas) to the oxygen consumption device 44. When the on-off valve 66 of the tank 50 is closed, the first control process proceeds to step S6.

In step S6, the control device 58 controls the valve device 46 to switch the supply destination of the hydrogen-containing gas output from the solid oxide electrolysis stack 18 to the generating device 20. Thus, the hydrogen-containing gas output from the solid oxide electrolysis stack 18 is supplied to the generating device 20 via the hydrogen-containing gas path 38. As a result, the generation of hydrocarbons by the generating device 20 is started. When the supply destination of the hydrogen-containing gas is switched to the generating device 20, the control device 58 terminates the measurements by the oxygen concentration sensor 56. Thereafter, the first control process is terminated.

Figure 3:
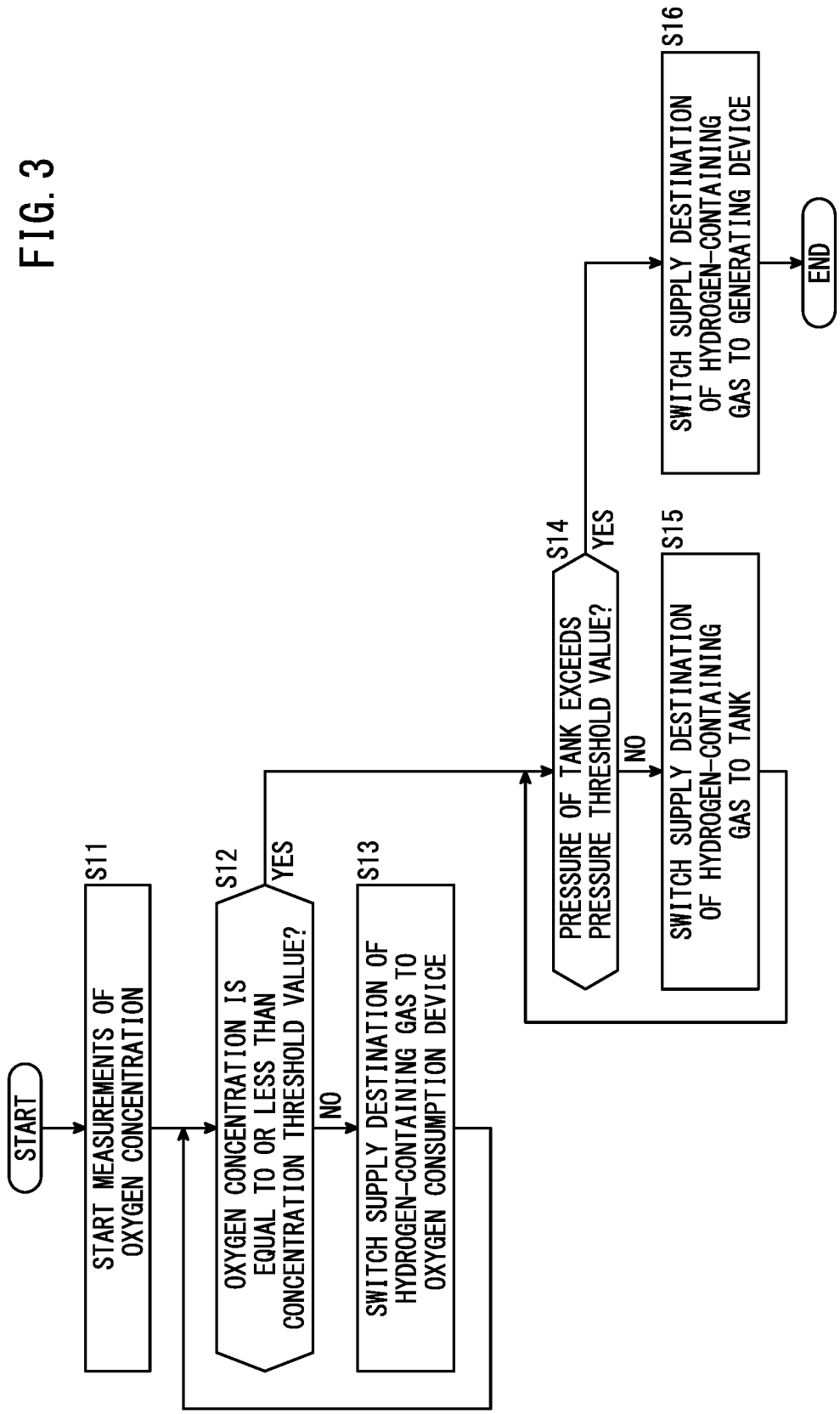
FIG. 3 is a flowchart showing the procedure of a second control process.

After finishing executing the first control process, the control device 58 executes the second control process. FIG. 3 is a flowchart showing the procedure of the second control process. The second control process is repeatedly executed at predetermined intervals until a command to stop the operation of the solid oxide electrolysis stack 18 is received.

In step S11, the control device 58 causes the oxygen concentration sensor 56 to start measurements. When the measurements of the oxygen concentration sensor 56 is started, the second control process proceeds to step S12.

In step S12, the control device 58 compares the oxygen concentration detected by the oxygen concentration sensor 56 with a predetermined concentration threshold value. When the oxygen concentration exceeds the concentration threshold value (step S12: NO), the second control process proceeds to step S13.

In step S13, the control device 58 controls the valve device 46 to switch the supply destination of the hydrogen-containing gas output from the solid oxide electrolysis stack 18 to the oxygen consumption device 44. Further, the control device 58 controls the second valve device 52 to switch to the oxygen consumption device 44 the destination of the hydrogen-containing gas supplied to the hydrogen-containing gas branch path 60. Thus, the hydrogen-containing gas output from the solid oxide electrolysis stack 18 is supplied to the oxygen consumption device 44 via the hydrogen-containing gas branch path 60. In this case, the generation of hydrocarbons by the generating device 20 is interrupted. In addition, the oxygen gas is prevented from reaching the generating device 20. When the supply destination of the hydrogen-containing gas is switched to the oxygen consumption device 44, the second control process returns to step S12.

In step S12, when the oxygen concentration is equal to or less than the concentration threshold value (step S12: YES), the second control process proceeds to step S14.

In step S14, the control device 58 compares the pressure of the tank 50 detected by the pressure sensor 68 with a predetermined pressure threshold value. When the pressure of the tank 50 is equal to or lower than the pressure threshold value (step S14: NO), the control device 58 determines that it is necessary to resupply the tank 50 with hydrogen. In this case, the second control process proceeds to step S15.

In step S15, the control device 58 controls the valve device 46 to switch the supply destination of the hydrogen-containing gas output from the solid oxide electrolysis stack 18 to the oxygen consumption device 44. Further, the control device 58 controls the second valve device 52 to switch the supply destination of the hydrogen-containing gas supplied to the hydrogen-containing gas branch path 60 to the tank 50. When the supply destination of the hydrogen-containing gas is switched to the tank 50, the second control process returns to step S14.

When the supply destination of the hydrogen-containing gas is switched to the tank 50, the tank 50 is resupplied, via the hydrogen-containing gas branch path 60 and the bypass path 62, with the hydrogen-containing gas output from the solid oxide electrolysis stack 18. Thereafter, the hydrogen-containing gas resupplied to the tank 50 is utilized by the oxygen consumption device 44. Thus, in the present embodiment, the hydrogen-containing gas produced by the solid oxide electrolysis stack 18 can be utilized by the oxygen consumption device 44. As a result, hydrogen utilization efficiency can be improved.

Hydrogen stored in the tank 50 tends to leak to the outside. Therefore, even if the hydrogen stored in the tank 50 is not supplied to the oxygen consumption device 44, the amount of hydrogen stored in the tank 50 may reduce. In the present embodiment, since the hydrogen-containing gas generated by the solid oxide electrolysis stack 18 is automatically resupplied to the tank 50, the efficiency of resupplying hydrogen can be improved.

In step S14, when the pressure of the tank 50 exceeds the pressure threshold value (step S14: YES), the control device 58 determines that it is not necessary to resupply the tank 50 with hydrogen. In this case, the second control process proceeds to step S16.

In step S16, the control device 58 controls the valve device 46 to switch the supply destination of the hydrogen-containing gas output from the solid oxide electrolysis stack 18 to the generating device 20. Thus, the hydrogen-containing gas output from the solid oxide electrolysis stack 18 is supplied to the generating device 20 via the hydrogen-containing gas path 38. As a result, the generation of hydrocarbons by the generating device 20 is restarted. When the supply destination of the hydrogen-containing gas is switched to the generating device 20, the control device 58 terminates the measurements by the oxygen concentration sensor 56. Thereafter, the second control process is terminated.

As described above, in the first embodiment, when the oxygen concentration exceeds the concentration threshold value, the control device 58 switches the supply destination of the hydrogen-containing gas output from the solid oxide electrolysis stack 18 to the oxygen consumption device 44. As a result, it is possible to suppress the oxygen gas from reaching the generating device 20 and as a result, it is possible to alleviate deterioration of the catalyst used for the generating device 20.

The first embodiment described above may be modified as follows.

The control device 58 may control an exhaust-gas on-off valve 70 (FIG. 1) in accordance with the pressure detected by the pressure sensor 68. The exhaust-gas on-off valve 70 is provided on the exhaust gas path 34 between the carbon dioxide emission source and the oxygen consumption device 44. The exhaust-gas on-off valve 70 can be opened and closed by a stack control device. The stack control device is a device for controlling the solid oxide electrolysis stack 18.

Figure 4:
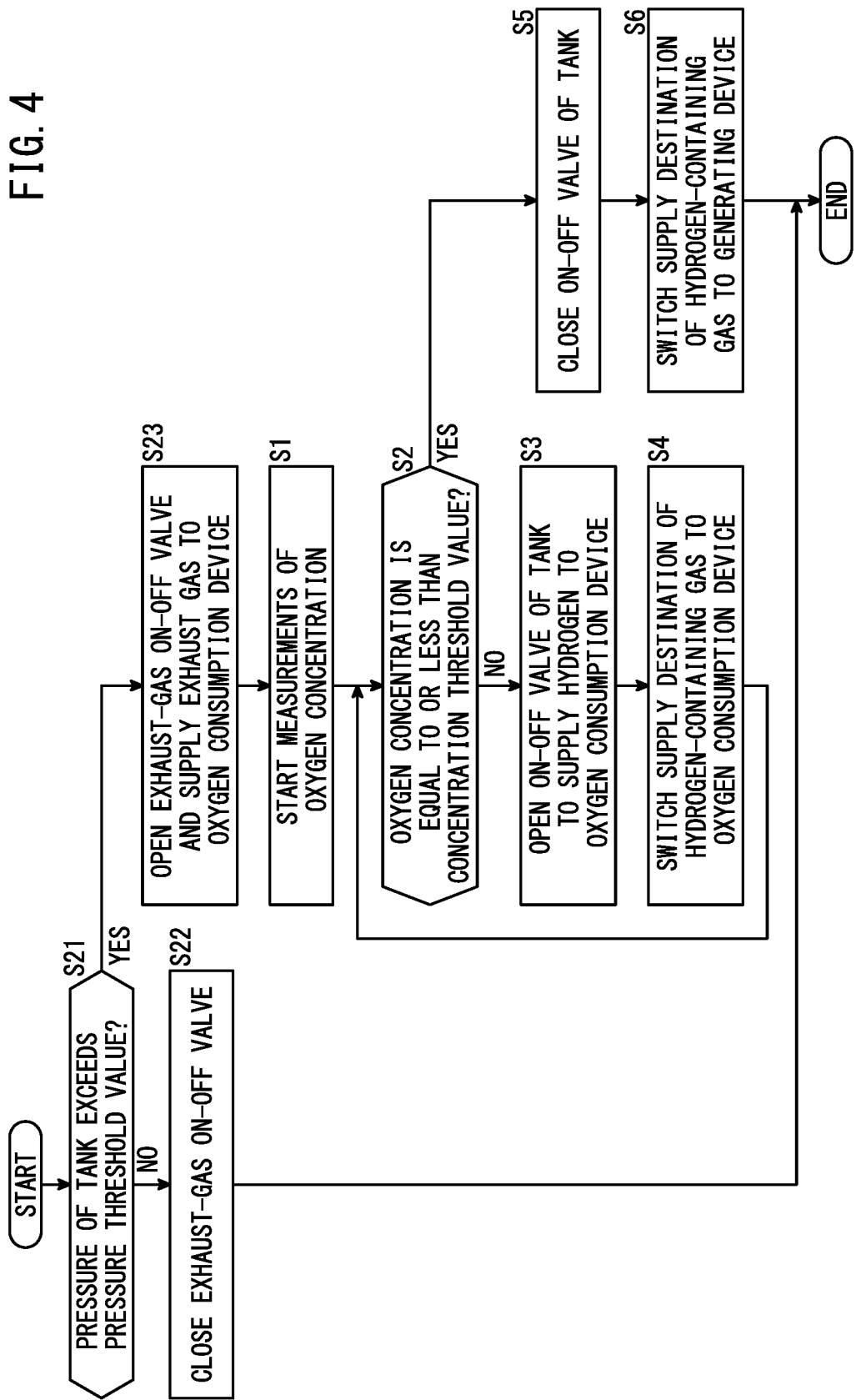
FIG. 4 is a flowchart showing the procedure of the first control process according to a modification.

FIG. 4 is a flowchart showing the procedure of the first control process according to the modification. In FIG. 4, the same steps as those described in the first embodiment are given the same reference numerals. In this modified example, descriptions that overlap with those of the first embodiment are omitted. In a first control process of this modification, steps S21, S22, and S23 are newly added.

In the first control process of the present modification, upon receiving an instruction to activate the solid oxide electrolysis stack 18, the process proceeds to step S21.

In step S21, the control device 58 compares the pressure of the tank 50 detected by the pressure sensor 68 with a predetermined pressure threshold value. When the pressure of the tank 50 is equal to or lower than the pressure threshold value (step S21: NO), the control device 58 determines that it is necessary to resupply the tank 50 with hydrogen. In this case, the first control process proceeds to step S22.

In step S22, the control device 58 closes the exhaust-gas on-off valve 70. Thus, the oxygen gas is prevented from reaching the generating device 20 via the solid oxide electrolysis stack 18. The control device 58 may output a stop command to the stack control device to stop the operation of the solid oxide electrolysis stack 18. Further, the control device 58 may control at least one of a display device, a speaker, and a light emitting device to give a warning indicating that the remaining amount of hydrogen stored in the tank 50 is low. Thus, the shortage of hydrogen in the tank 50 at the start of the solid oxide electrolysis stack 18 can be avoided.

On the other hand, when the pressure exceeds the pressure threshold value (step S21: YES), the control device 58 determines that it is not necessary to resupply the tank 50 with hydrogen. In this case, the first control process proceeds to step S23.

In step S23, the control device 58 opens the exhaust-gas on-off valve 70 and supplies the exhaust gas to the oxygen consumption device 44. When the exhaust-gas on-off valve 70 is opened, the first control process proceeds to step S1.

Figure 5:
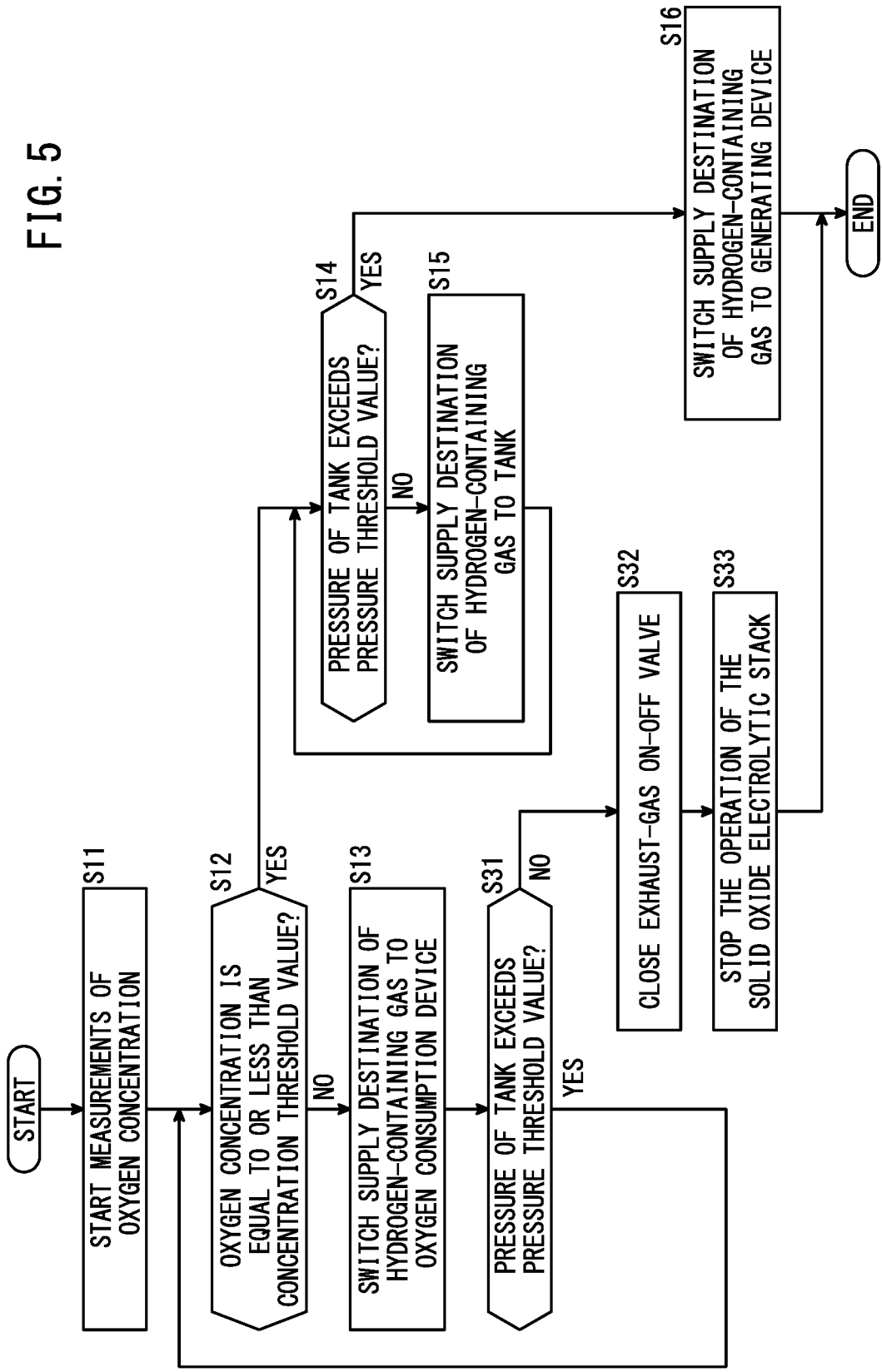
FIG. 5 is a flowchart showing the procedure of the second control process according to a modification.

FIG. 5 is a flowchart showing the procedure of the second control process according to the modification. In FIG. 5, the same steps as those described in the first embodiment are denoted by the same reference numerals. In this modified example, descriptions that overlap with those of the first embodiment are omitted. In the second control process of this modification example, steps S31, S32 and S33 are newly added. The second control process of the present modification moves from step S13 to step S31.

In step S31, the control device 58 compares the pressure detected by the pressure sensor 68 with a predetermined pressure threshold value. When the pressure of the tank 50 exceeds a pressure threshold value (step S31: YES), the second control process returns to step S12. On the contrary, when the pressure of the tank 50 is equal to or less than the pressure threshold value (step S31: NO), the second control process proceeds to step S32.

In step S32, the control device 58 closes the exhaust-gas on-off valve 70. Thus, the oxygen gas is prevented from reaching the generating device 20 via the solid oxide electrolysis stack 18. When the exhaust-gas on-off valve 70 is closed, the second control process proceeds to step S33.

In step S33, the control device 58 outputs a stop command to the stack control device to stop the operation of the solid oxide electrolysis stack 18. Thus, the oxygen gas is prevented from reaching the generating device 20 via the solid oxide electrolysis stack 18. Further, a wasteful driving of the solid oxide electrolysis stack 18 can be avoided.

Second Embodiment

Figure 6:
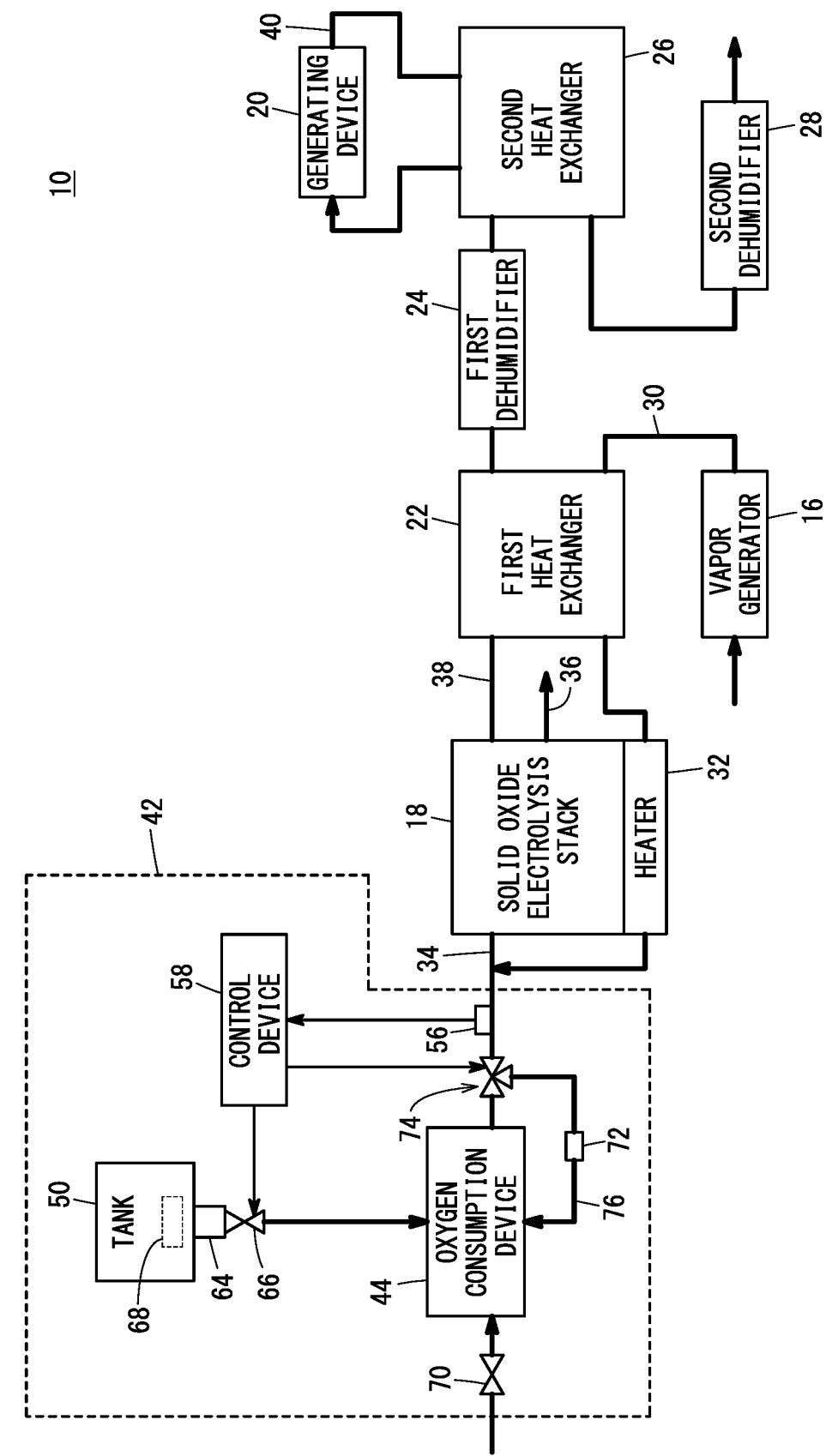
FIG. 6 is a schematic diagram showing the configuration of an electrolysis system according to the second embodiment.

FIG. 6 is a schematic diagram showing the configuration of the electrolysis system 10 according to the second embodiment. In FIG. 6, the same components as those described in the first embodiment are denoted by the same reference numerals. In the present embodiment, descriptions that overlap with those of the first embodiment are omitted.

In the electrolysis system 10 of the present embodiment, the components of the oxygen gas consumption mechanism 42 are different from those in the first embodiment. The oxygen gas consumption mechanism 42 of the present embodiment includes the oxygen consumption device 44, the tank 50, the oxygen concentration sensor 56, the control device 58, a circulation pump 72, and a valve device 74.

The circulation pump 72 is provided on an exhaust gas branch path 76. The exhaust gas branch path 76 branches from the exhaust gas path 34 and is connected to the oxygen consumption device 44. The circulation pump 72 raises the pressure of the exhaust gas supplied from the exhaust gas path 34 to the exhaust gas branch path 76 and returns the pressure-raised exhaust gas to the oxygen consumption device 44. The circulation pump 72 is not an essential component. That is, the circulation pump 72 may be omitted. In this case, the exhaust gas supplied from the exhaust gas path 34 to the exhaust gas branch path 76 returns to the oxygen consumption device 44 without the pressure being raised.

The valve device 74 is configured in a manner that the supply destination of exhaust gas outputted from the oxygen consumption device 44 can be switched to the oxygen consumption device 44 or the solid oxide electrolysis stack 18. The valve device 74 may be made up from a three way valve or two on-off valves.

When the valve device 74 is made up from a three way valve, the three way valve is provided at a portion (third contact point) where the exhaust gas path 34 and the exhaust gas branch path 76 are in contact with each other. When the valve device 74 is made up from two on-off valves, one of the two on-off valves is provided on the exhaust gas path 34 between the third contact point and the solid oxide electrolysis stack 18. The other of the two on-off valves is provided on the exhaust gas branch path 76 near the third contact point. In the present embodiment, the valve device 74 is made up from a three way valve (see FIG. 6).

The valve device 74 is controlled by a control device 58. When the oxygen concentration detected by the oxygen concentration sensor 56 exceeds a predetermined concentration threshold value, the control device 58 controls the valve device 74 to switch the supply destination of the exhaust gas to the oxygen consumption device 44. In this case, the control device 58 opens the on-off valve 66 of the tank 50 to supply hydrogen to the oxygen consumption device 44. Thus, the oxygen gas contained in the exhaust gas can be consumed by the oxygen consumption device 44, and as a result, the exhaust gas in which the purity of carbon dioxide has gone up can be acquired.

When the oxygen concentration exceeds the concentration threshold value, the control device 58 maintains a state in which the supply destination of the exhaust gas has been switched to the oxygen consumption device 44 until the oxygen concentration becomes equal to or lower than the concentration threshold value. Therefore, the exhaust gas circulates through the oxygen consumption device 44. Therefore, the purity of carbon dioxide can be surely raised.

When the oxygen concentration detected by the oxygen concentration sensor 56 is equal to or less than a predetermined concentration threshold value, the control device 58 controls the valve device 74 to switch the supply destination of the exhaust gas to the solid oxide electrolysis stack 18. In this case, the control device 58 closes the on-off valve 66 of the tank 50. Therefore, the exhaust gas with a high purity of carbon dioxide is supplied to the solid oxide electrolysis stack 18.

As described above, in the present embodiment, similar to the first embodiment, it is possible to prevent the oxygen gas from reaching the generating device 20 and as a result, it is possible to alleviate the deterioration of the catalyst used for the generating device 20.

The present embodiment can be incorporated into the first embodiment. In this case, the oxygen gas consumption mechanism 42 (FIG. 1) of the first embodiment is provided with the valve device 74 as a third valve device. The oxygen gas consumption mechanism 42 according to the first embodiment is provided with an exhaust gas branch path 76.

Third Embodiment

When the supply of electric power to the electrolysis system 10 is interrupted because of a power failure and the like, the operation of the solid oxide electrolysis stack 18 stops, resulting in that the temperature of the solid oxide electrolysis stack 18 starts to decrease. In this case, the solid oxide electrolysis stack 18 tends to have negative pressure because of condensation of water vapor remaining inside the solid oxide electrolysis stack 18. When the solid oxide electrolysis stack 18 has negative pressure, air flows into the solid oxide electrolysis stack 18, and the oxygen partial pressure increases inside the solid oxide electrolysis stack 18. Therefore, the fuel electrode (anode electrode) of the solid oxide electrolysis stack 18 in high temperatures tends to be oxidized. When the fuel electrode (anode electrode) and the like is oxidized, deterioration of the MEA such as lowering of the catalytic performance, appearing of internal cracks, and the like occurs.

Figure 7:
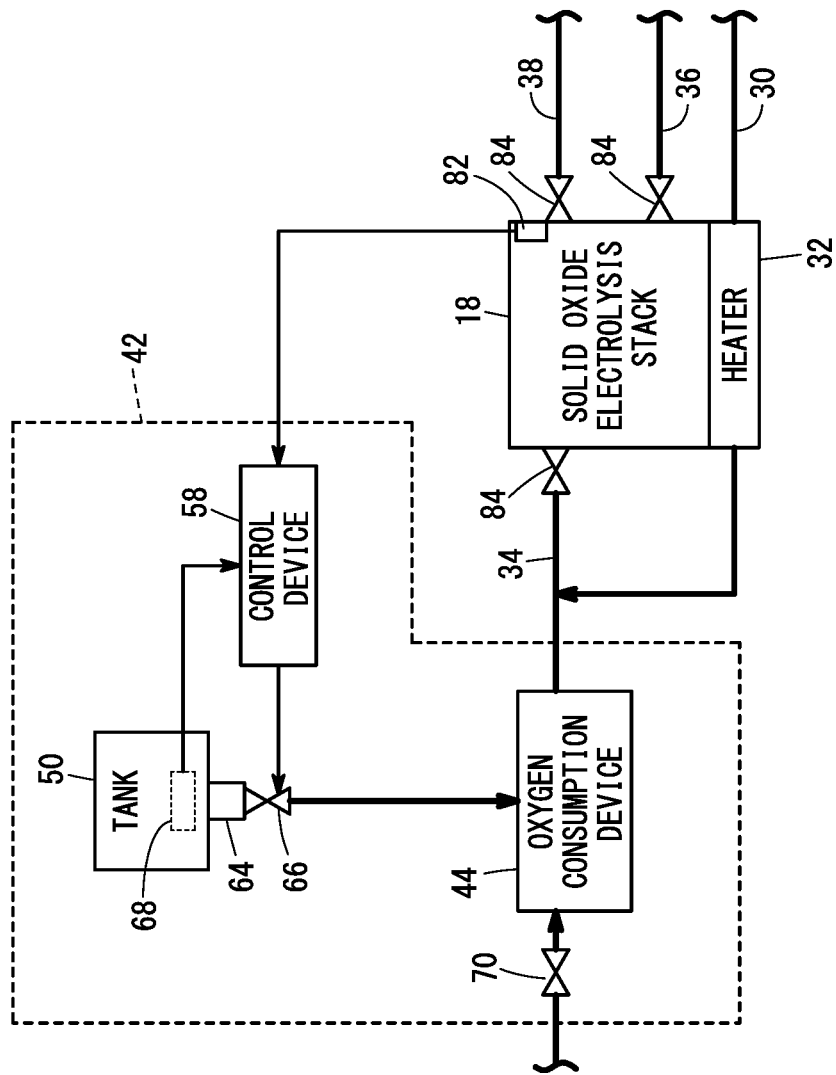
FIG. 7 is a schematic diagram showing the configuration of an electrolysis system according to the third embodiment.

As a third embodiment, an embodiment in which an increase in the oxygen partial pressure inside the solid oxide electrolysis stack 18 is prevented when the supply of power to the electrolysis system 10 is interrupted will be described. FIG. 7 is a schematic diagram showing the configuration of an electrolysis system 10 according to a third embodiment. FIG. 7 shows the components common to the first embodiment and the second embodiment. The present embodiment may be applied to the first embodiment or the second embodiment. The electrolysis system 10 of the present embodiment is newly provided with a temperature sensor 82 and a plurality of sealing valves 84.

The temperature sensor 82 is a sensor for detecting the temperature of the solid oxide electrolysis stack 18. The temperature sensor 82 is provided, for example, at an outlet of the solid oxide electrolysis stack 18 to which the hydrogen-containing gas path 38 is connected.

Each of the plurality of sealing valves 84 is a valve for sealing (stopping flows from going into or out of) the solid oxide electrolysis stack 18. One of the plurality of sealing valves 84 is provided at an inlet of the solid oxide electrolysis stack 18 to which the exhaust gas path 34 is connected. Another one of the plurality of sealing valves 84 is provided at the outlet of the solid oxide electrolysis stack 18 to which the hydrogen-containing gas path 38 is connected. The last one of the plurality of sealing valves 84 is provided at the outlet of the solid oxide electrolysis stack 18 to which the oxygen gas path 36 is connected.

When the supply of electric power to the electrolysis system 10 is interrupted because of a power failure and the like, the on-off valve 66 of the tank 50 automatically opens without being controlled by the control device 58. Further, when the supply of electric power to the electrolysis system 10 is interrupted, the exhaust-gas on-off valve 70 automatically closes without being controlled by the control device 58. That is, the on-off valve 66 is a normally open valve, and the exhaust-gas on-off valve 70 is a normally closed valve. When the supply of electric power to the electrolysis system 10 is interrupted and the on-off valve 66 is opened, hydrogen stored in the tank 50 is supplied to the solid oxide electrolysis stack 18 via the oxygen consumption device 44.

Figure 8:
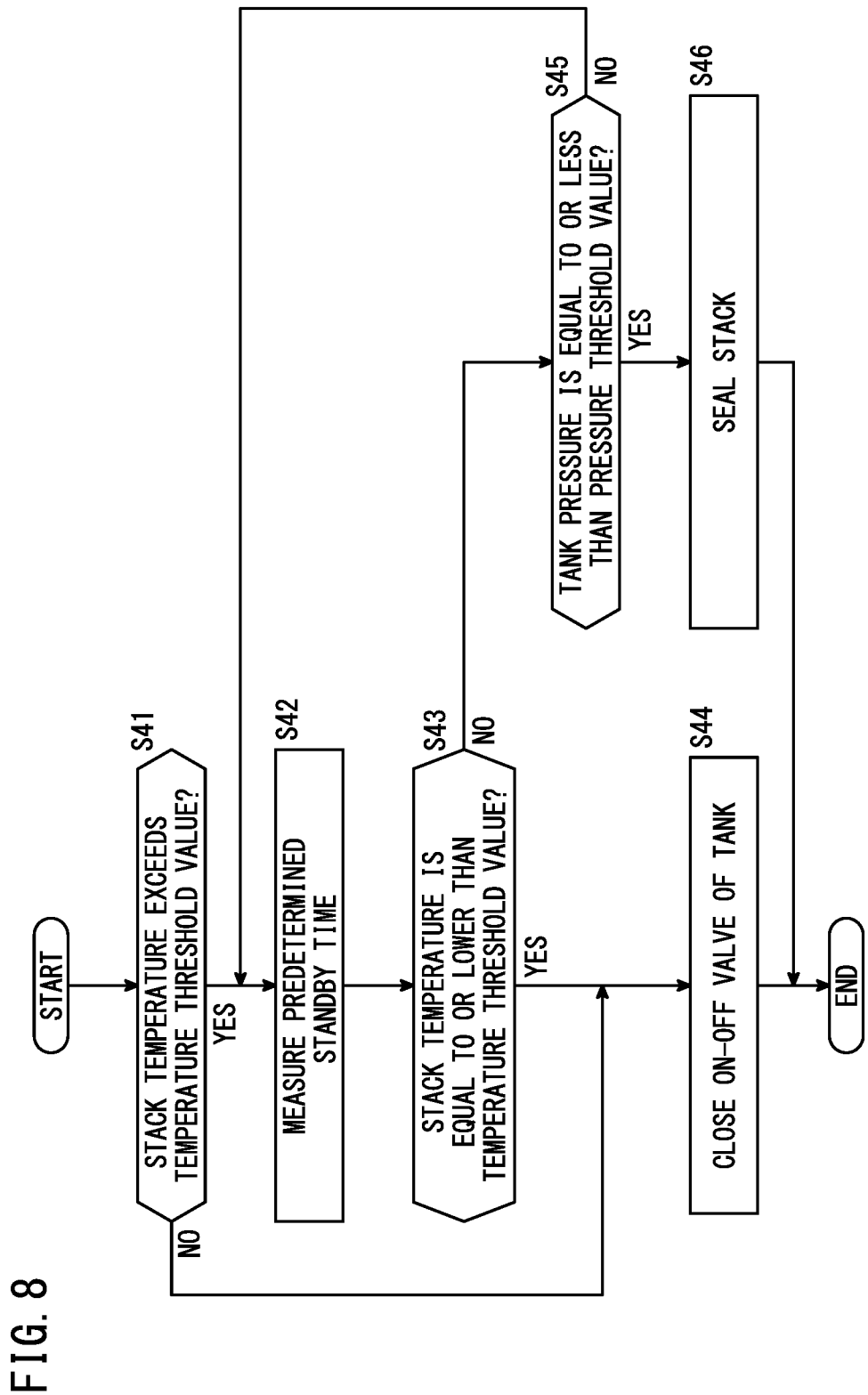
FIG. 8 is a flowchart showing the procedure of a third control process.

When the power supply to the electrolysis system 10 is interrupted, the control device 58 is supplied with reserve power from a reserve power source and the like. The control device 58 executes the third control process based on the reserve power. FIG. 8 is a flowchart showing the procedure of the third control process. The third control process is started after the supply of electric power to the electrolysis system 10 is interrupted. At the start of the third control process, the on-off valve 66 is open and hydrogen is supplied to the solid oxide electrolysis stack 18.

In step S41, the control device 58 compares the temperature (stack temperature) of the solid oxide electrolysis stack 18 detected by the temperature sensor 82 with a predetermined temperature threshold value. The temperature threshold value is, for example, atmospheric temperature. The atmospheric temperature may be set in advance in the control device 58 or may be a temperature detected by an atmospheric temperature sensor for detecting the atmospheric temperature. The location where the air temperature sensor is installed is a location where fluctuations in the air temperature due to heat generated by the solid oxide electrolysis stack 18 becomes equal to or less than a constant value.

When the stack temperature is equal to or lower than the temperature threshold value (step S41: NO), the third control process proceeds to step S44. On the other hand, when the stack temperature exceeds the temperature threshold value (step S41: YES), the third control process proceeds to step S42.

In step S42, the control device 58 measures a predetermined standby time. During the standby time, the on-off valve 66 is not closed and the supply of hydrogen to the solid oxide electrolysis stack 18 continues. When the predetermined standby time is measured, the third control process proceeds to step S43.

In step S43, the control device 58 compares the stack temperature with a predetermined temperature threshold value. When the stack temperature is equal to or lower than the temperature threshold value (step S43: YES), the third control process proceeds to step S44. On the other hand, when the stack temperature exceeds the temperature threshold value (step S43: NO), the third control process proceeds to step S45.

In step S44, the control device 58 closes the on-off valve 66. In this case, the control device 58 supplies reserve power to the on-off valve 66. When the on-off valve 66 is closed, the third control process is terminated.

In step S45, the control device 58 compares the pressure (tank pressure) detected by the pressure sensor 68 with a predetermined pressure threshold value. When the tank pressure exceeds the pressure threshold value (step S45: NO), the third control process returns to step S42. On the other hand, when the tank pressure is equal to or less than the pressure threshold value (step S45: YES), the third control process proceeds to step S46.

In step S46, the control device 58 closes each sealing valve 84 and seals the solid oxide electrolysis stack 18. When each sealing valve 84 is closed, the third control process is terminated.

In the present embodiment, when the stack temperature exceeds the temperature threshold value during interruption of the power supply, the control device 58 does not close the on-off valve 66 until the stack temperature becomes equal to or lower than the temperature threshold value. In this case, the supply of hydrogen from the tank 50 to the solid oxide electrolysis stack 18 continues. Thus, an increase in the oxygen partial pressure inside the solid oxide electrolysis stack 18 can be suppressed and as a result, deterioration of the MEA of the solid oxide electrolysis stack 18 due to oxidation at high temperatures can be suppressed.

Further, in the present embodiment, when the tank pressure becomes equal to or lower than a predetermined pressure threshold value before the stack temperature becomes equal to or lower than the temperature threshold value, the control device 58 closes each sealing valve 84 to seal the solid oxide electrolysis stack 18. Thus, even if hydrogen cannot be supplied to the solid oxide electrolysis stack 18, the oxygen partial pressure inside the solid oxide electrolysis stack 18 can be prevented from increasing.

[Invention]

The inventions and effects that can be understood from the above description will be described below.

(1) An electrolysis system (10) includes: a solid oxide electrolysis stack (18) that electrolyzes carbon dioxide gas and water vapor; a generating device (20) that generates a hydrocarbon from hydrogen-containing gas containing hydrogen gas generated by the solid oxide electrolysis stack through electrolysis; an oxygen consumption device (44) that consumes, using hydrogen, oxygen gas contained in exhaust gas containing the carbon dioxide gas; an exhaust gas path (34) that is configured to supply, from the oxygen consumption device to the solid oxide electrolysis stack, the exhaust gas in which purity of the carbon dioxide gas has risen because of consumption of the oxygen gas; a hydrogen-containing gas path (38) that is configured to supply the hydrogen-containing gas from the solid oxide electrolysis stack to the generating device; a hydrogen-containing gas branch path (60) that branches from the hydrogen-containing gas path and is connected to the oxygen consumption device; an oxygen concentration sensor (56) that detects an oxygen concentration in the exhaust gas output from the oxygen consumption device; a valve device (46) that is configured to switch a supply destination of the hydrogen-containing gas output from the solid oxide electrolysis stack to either one of the oxygen consumption device or the generating device; and a control device (58) that controls the valve device according to the oxygen concentration to switch the supply destination of the hydrogen-containing gas.

As a result, it is possible to prevent oxygen from reaching the generating device and as a result, it is possible to alleviate deterioration of the catalyst used for the generating device.

(2) The present invention is the electrolysis system wherein in a case where the oxygen concentration exceeds a predetermined concentration threshold value, the control device may control the valve device to switch the supply destination of the hydrogen-containing gas to the oxygen consumption device. Thus, it can be arranged that only when the oxygen concentration in the exhaust gas is high, the oxygen gas in the exhaust gas is consumed by the oxygen consumption device.

(3) The present invention is the electrolysis system including a tank (50) that is configured to store the hydrogen supplied to the oxygen consumption device; and an on-off valve (66) that is configured to open and close an outlet (64) of the tank, wherein in a case where the solid oxide electrolysis stack is activated, the control device may open the on-off valve to supply the hydrogen stored in the tank to the oxygen consumption device via the hydrogen-containing gas branch path. Thus, even when the hydrogen gas is not sufficiently generated by the solid oxide electrolysis stack, the oxygen gas in the exhaust gas can be consumed at the oxygen consumption device. As a result, the oxygen concentration in the exhaust gas can be reduced more quickly.

(4) The present invention is the electrolysis system wherein the on-off valve may open in a case where power supply to the electrolysis system is interrupted, and the hydrogen stored in the tank may be supplied to the solid oxide electrolysis stack via the oxygen consumption device. As a result, it is possible to suppress an increase in the oxygen partial pressure inside the solid oxide electrolysis stack during interruption of power supply. As a result, deterioration of the MEA of the solid oxide electrolysis stack due to oxidation at high temperatures can be suppressed.

(5) The present invention is the electrolysis system wherein in a case where the temperature of the solid oxide electrolysis stack exceeds a predetermined temperature threshold value during interruption of power supply to the electrolysis system, the control device may continue supplying hydrogen from the tank to the solid oxide electrolysis stack without closing the on-off valve until the temperature becomes equal to or lower than the temperature threshold value. Thus, it is possible to suppress degradation of the MEA of the solid oxide electrolysis stack caused by oxidation at high temperatures.

(6) The present invention is the electrolysis system including a plurality of sealing valves (84) that is configured to seal the solid oxide electrolysis stack wherein the control device may close each of the sealing valves to seal the solid oxide electrolysis stack in a case where the pressure in the tank becomes equal to or lower than a predetermined pressure threshold value before the temperature becomes equal to or lower than the temperature threshold value. Thus, even if hydrogen cannot be supplied to the solid oxide electrolysis stack, an increase in the oxygen partial pressure inside the solid oxide electrolysis stack can be suppressed.

(7) The present invention is the electrolysis system including: a bypass path (62) that branches from the hydrogen-containing gas branch path, passes through the tank, and joins the hydrogen-containing gas branch path; a pressure sensor (68) that detects the pressure in the tank; and a second valve device (52) that is configured to switch a supply destination of the hydrogen-containing gas supplied from the hydrogen-containing gas path to either one of the oxygen consumption device or the tank, wherein in a case where the pressure is equal to or lower than a predetermined pressure threshold value and the oxygen concentration is equal to or lower than a predetermined concentration threshold value, the control device may control the second valve device to switch the supply destination of the hydrogen-containing gas to the tank. Thus, the amount of hydrogen in the tank can be resupplied with the hydrogen-containing gas. In addition, the hydrogen-containing gas produced by the solid oxide electrolysis stack can be utilized for the oxygen consumption device. As a result, hydrogen utilization efficiency can be improved.

(8) The present invention is the electrolysis system wherein the oxygen consumption device may include a catalyst for reacting the oxygen gas with hydrogen gas to produce water. Thus, the oxygen gas can be efficiently consumed.

(9) The present invention is the electrolysis system including: an exhaust gas branch path (76) that branches from the exhaust gas path and is connected to the oxygen consumption device; and a third valve device (74) that is configured to switch a supply destination of the exhaust gas output from the oxygen consumption device to either one of the oxygen consumption device or the solid oxide electrolysis stack, wherein in a case where the oxygen concentration exceeds a predetermined concentration threshold value, the control device may control the third valve device to switch the supply destination of the exhaust gas to the oxygen consumption device. Thus, the exhaust gas is circulated through the oxygen consumption device. Therefore, the purity of carbon dioxide can be surely raised.

(10) The present invention is an electrolysis system (10) including: a solid oxide electrolysis stack (18) that electrolyzes carbon dioxide gas and water vapor; and a generating device (20) that generates a hydrocarbon from a hydrogen-containing gas containing hydrogen gas generated by the solid oxide electrolysis stack through electrolysis; an oxygen consumption device (44) that consumes, using hydrogen, oxygen gas contained in exhaust gas containing the carbon dioxide gas; an exhaust gas path (34) that is configured to supply the exhaust gas from the oxygen consumption device to the solid oxide electrolysis stack; an exhaust gas branch path (76) that branches from the exhaust gas path and is connected to the oxygen consumption device; an oxygen concentration sensor (56) that detects the oxygen concentration in the exhaust gas output from the oxygen consumption device; a valve device (74) that is configured to switch the supply destination of the exhaust gas output from the oxygen consumption device to the oxygen consumption device or the solid oxide electrolysis stack; a tank (50) that is configured to store the hydrogen supplied to the oxygen consumption device; and a control device (58) that controls the valve device according to the oxygen concentration to switch the supply destination of the exhaust gas to the oxygen consumption device and to open an on-off valve (66) that opens and closes an outlet (64) of the tank.

As a result, it is possible to prevent oxygen from reaching the generating device and as a result, it is possible to alleviate deterioration of the catalyst used in the generating device.

The present invention is not limited to the above disclosure, and various modifications are possible without departing from the essence and gist of the present invention.

The invention claimed is:

1. An electrolysis system comprising:
a solid oxide electrolysis stack that electrolyzes carbon dioxide gas and water vapor;
a generating device that generates a hydrocarbon from hydrogen-containing gas containing hydrogen gas generated by the solid oxide electrolysis stack through electrolysis;
an oxygen consumption device that consumes, using hydrogen, oxygen gas in exhaust gas containing the carbon dioxide gas;
an exhaust gas path that is configured to supply, from the oxygen consumption device to the solid oxide electrolysis stack, the exhaust gas in which purity of the carbon dioxide gas has risen because of consumption of the oxygen gas;
a hydrogen-containing gas path that is configured to supply the hydrogen-containing gas from the solid oxide electrolysis stack to the generating device;
a hydrogen-containing gas branch path that branches from the hydrogen-containing gas path and is connected to the oxygen consumption device;
an oxygen concentration sensor that detects an oxygen concentration in the exhaust gas output from the oxygen consumption device;
a valve device that is configured to switch a supply destination of the hydrogen-containing gas output from the solid oxide electrolysis stack to either one of the oxygen consumption device or the generating device; and
a control device that controls the valve device according to the oxygen concentration to switch the supply destination of the hydrogen-containing gas.

2. The electrolysis system according to claim 1, wherein
in a case where the oxygen concentration exceeds a predetermined concentration threshold value, the control device controls the valve device to switch the supply destination of the hydrogen-containing gas to the oxygen consumption device.

3. The electrolysis system according to claim 2, further comprising:
a tank that is configured to store the hydrogen supplied to the oxygen consumption device; and
an on-off valve that is configured to open and close an outlet of the tank,
wherein
in a case where the solid oxide electrolysis stack is activated, the control device opens the on-off valve to supply the hydrogen stored in the tank to the oxygen consumption device via the hydrogen-containing gas branch path.

4. The electrolysis system according to claim 3, wherein
the on-off valve opens in a case where power supply to the electrolysis system is interrupted, and the hydrogen stored in the tank is supplied to the solid oxide electrolysis stack via the oxygen consumption device.

5. The electrolysis system according to claim 3, wherein
in a case where a temperature of the solid oxide electrolysis stack exceeds a predetermined temperature threshold value during interruption of power supply to the electrolysis system, the control device continues supplying the hydrogen from the tank to the solid oxide electrolysis stack without closing the on-off valve until the temperature becomes equal to or lower than the temperature threshold value.

6. The electrolysis system according to claim 5, further comprising
a plurality of sealing valves that are configured to seal the solid oxide electrolysis stack,
wherein
the control device closes each of the sealing valves to seal the solid oxide electrolysis stack in a case where pressure in the tank becomes equal to or lower than a predetermined pressure threshold value before the temperature becomes equal to or lower than the temperature threshold value.

7. The electrolysis system according to claim 3, further comprising:
   a bypass path that branches from the hydrogen-containing gas branch path, passes through the tank, and joins the hydrogen-containing gas branch path;
   a pressure sensor that detects pressure in the tank; and
   a second valve device that is configured to switch a supply destination of the hydrogen-containing gas supplied from the hydrogen-containing gas path to either one of the oxygen consumption device or the tank,
   wherein
   in a case where the pressure is equal to or lower than a predetermined pressure threshold value and the oxygen concentration is equal to or lower than the predetermined concentration threshold value, the control device controls the second valve device to switch the supply destination of the hydrogen-containing gas to the tank.

8. The electrolysis system according to claim 1,
   wherein
   the oxygen consumption device includes a catalyst for reacting the oxygen gas with hydrogen gas to produce water.

9. The electrolysis system according to claim 1, further comprising:
   an exhaust gas branch path that branches from the exhaust gas path and is connected to the oxygen consumption device; and
   a third valve device that is configured to switch a supply destination of the exhaust gas output from the oxygen consumption device to either one of the oxygen consumption device or the solid oxide electrolysis stack,
   wherein
   in a case where the oxygen concentration exceeds a predetermined concentration threshold value, the control device controls the third valve device to switch the supply destination of the exhaust gas to the oxygen consumption device.

10. An electrolysis system comprising:
    a solid oxide electrolysis stack that electrolyzes carbon dioxide gas and water vapor;
    a generating device that generates a hydrocarbon from a hydrogen-containing gas containing hydrogen gas generated by the solid oxide electrolysis stack through electrolysis;
    an oxygen consumption device that consumes, using hydrogen, oxygen gas in exhaust gas containing the carbon dioxide gas;
    an exhaust gas path that is configured to supply the exhaust gas from the oxygen consumption device to the solid oxide electrolysis stack;
    an exhaust gas branch path that branches from the exhaust gas path and is connected to the oxygen consumption device;
    an oxygen concentration sensor that detects an oxygen concentration in the exhaust gas output from the oxygen consumption device;
    a valve device that is configured to switch a supply destination of the exhaust gas output from the oxygen consumption device to the oxygen consumption device or the solid oxide electrolysis stack;
    a tank that is configured to store the hydrogen supplied to the oxygen consumption device; and
    a control device that controls the valve device according to the oxygen concentration to switch the supply destination of the exhaust gas to the oxygen consumption device and to open an on-off valve that opens and closes an outlet of the tank.

* * * * *